May 2, 1933.   A. H. KING ET AL   1,907,351
INTERNAL COMBUSTION ENGINE
Original Filed June 5, 1928
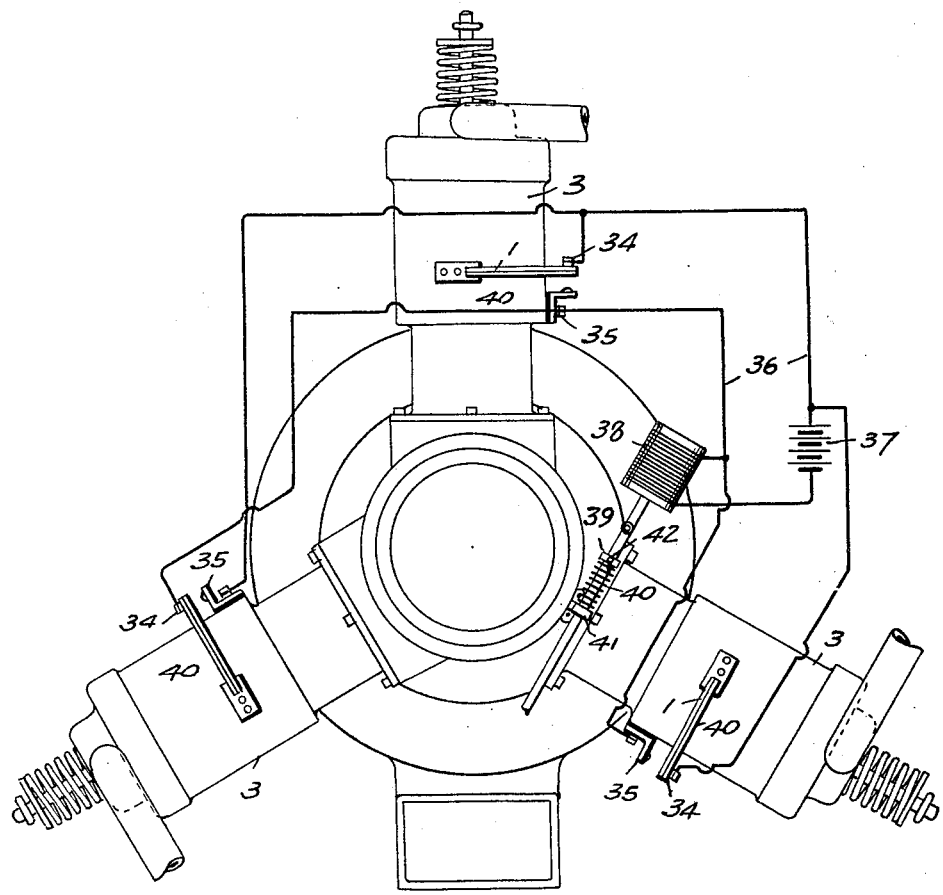
INVENTORS
ALEXANDER H. KING
EARLE A. RYDER Patented May 2, 1933

1,907,351

UNITED STATES PATENT OFFICE

ALEXANDER H. KING AND EARLE A. RYDER, OF WEST HARTFORD, CONNECTICUT, ASSIGNORS TO THE PRATT & WHITNEY AIRCRAFT COMPANY, OF HARTFORD, CONNECTICUT

INTERNAL COMBUSTION ENGINE

Original application filed June 5, 1928, Serial No. 283,081. Patent No. 1,838,408, dated December 29, 1931. Divided and this application filed August 31, 1929. Serial No. 389,785.

This invention relates in general to internal combustion engines and is more particularly concerned with thermostatic controls governing the operation of the same between certain ranges of combustion cylinder temperatures. This invention is a division from our original application Serial Number 283,081, filed June 5, 1928, patented Dec. 29, 1931 No. 1,838,408 and is especially directed to such thermostatic devices as applicable to spark adjustment control, throttle control and mixture control.

Internal combustion engines have a tendency to overheat under conditions of excess load, incorrect carburetion due to the use of low grade fuels or improper adjustment of fuel proportions, incorrect spark timing and other adverse conditions. Such conditions frequently cause detonation, which in turn causes further overheating, poor lubrication, loss in horsepower output and the final seizing of the pistons within their cylinders and the destruction of the engine.

It is well recognized that failure of an engine due to overheating is due to excessive temperature of the cylinder head or cylinder walls, and this excessive temperature may be caused either by high combustion temperature, deficiency of the cooling system, or a condition such as detonation, which causes a disproportionate part of the heat of combustion to be transferred to the cylinder walls.

The prior art contains efforts to regulate engine temperatures by control of the cooling means, as, for example, thermostatic control of the cooling water circulation. Such means are effective to maintain a certain minimum temperature which may be desirable for operation, but are powerless to limit the maximum temperature of the combustion chamber or cylinder whenever the conditions of operation cause the evolution and transfer to the cylinder walls of more heat than the cooling system is capable of absorbing.

In order to remove the danger which might otherwise arise from excess loads, poor fuel selection, improper spark timing, deficiency of the cooling system or other causes of overheating, it is the purpose of this invention to provide a means, governed by cylinder temperature, for controlling the amount of heat supplied to the cylinder walls. In general any control is effective which operates to reduce the pressure and/or temperature of combustion; or to prevent detonation if conditions likely to cause detonation are present.

Combustion temperature and effective combustion pressure may be lowered, and detonation, if any, may be reduced by partially closing the throttle, retarding the spark, enriching the fuel mixture, or by various combinations of the movements of these controls. It is, therefore, an object of this invention to provide a thermostatic means for automatically controlling the movement, within certain limits, of any or all of these three controls.

It is the prime object of this invention to provide a thermostat in thermal communication with a multi-cylindered engine, and electrical means for translating the movements of the thermostat into positive actuation of the engine operating controls in the manner required to reduce effective combustion pressure.

It is a further object of our invention to so adapt this electrical means to the particular uses of a multi-cylindered radial engine, providing a thermostat for each cylinder and so arranging our electrical means that it will be actuated by the thermostat of that cylinder having the highest temperature to operate the engine control, resilient means being provided to return the parts to their normal positions when the temperature is decreased.

Other objects of our invention will appear in the following specification and claims and will be disclosed in the accompanying drawing, in which—

The figure is an end elevation of our device as incorporated with a multi-cylindered radial internal combustion engine, the device being shown diagrammatically in part.

In this structure each of the cylinders 3 of an internal combustion engine is provided with a thermostat fixed thereto adjacent the head portion 40 thereof. The thermostat 1 is preferably, though not necessarily, comprised of two strips of metal of unequal coefficients of expansion and is attached at one end to the cylinder. Each of these thermostats is provided with an electric terminal 34 and its free end is adapted to be movable into contact with a contact member 35. These contacts form the terminals of an electrical circuit which includes the leads 36, the battery, or other source of electrical energy, 37, and the solenoid 38. The armature of the solenoid is a rod 39 which passes through a guide 41 secured to the crankcase of the engine.

A tension spring 40 is concentrically mounted on said rod having one end secured to the guide 41 and the other to an adjustable set screw 42, also concentric of the rod. Movement of the rod into the armature is resisted by the tension of this spring. The rod, at its lower end is connected to one or more of the engine operating controls, not shown. It will be noted that the thermostats are connected with the solenoid and source of electrical energy in parallel with the result that any one of the same may operate the said controls.

From the foregoing our device will be seen to operate as follows:

The free ends of the thermostats are so positioned that, when the thermostat is curved, under increasing cylinder temperatures, the thermostats will engage the contacts 35 at that degree of cylinder temperature considered excessive. When contact is made by any one of these thermostats with its contact 34, the solenoid will be energized and will draw the rod 39 inwardly against the action of spring 40 to retard the spark, enrich the mixture, or partially close the throttle as the case may be.

Having thus described our invention what we claim is—

1. In combination with a multi-cylindered internal combustion engine having an engine operating control, a separate thermostat for each cylinder and mounted in thermal communication therewith, an electrically operated means operatively connecting said thermostats and said engine control to actuate the latter when the temperature of any of said cylinders reaches a predetermined degree.

2. In combination with a multi-cylindered internal combustion engine having an engine operating control, a separate thermostat for each cylinder and mounted in thermal communication therewith, an electrically operated means operatively connecting said thermostats and said engine control to actuate the latter when the temperature of any of said cylinders reaches a predetermined degree, said means being adapted to permit of normal temperature increases without affecting said control.

3. In combination with a multi-cylindered internal combustion engine having an engine operating control, a separate thermostat for each cylinder and mounted in thermal communication therewith, and electrically operated means operatively connecting said thermostats and said engine control to actuate the latter when the temperature of any of said cylinders reaches a predetermined degree, and resiliently yieldable means opposing the action of said electrically operated means.

4. In combination with a multi-cylindered internal combustion engine having an engine operating control, a separate thermostat for each cylinder and mounted in thermal communication therewith, an electrically operated means operatively connecting said thermostats and said engine control to actuate the latter when the temperature of any of said cylinders reaches a predetermined degree, said means being adapted to permit of normal temperature increases without affecting said control, and resiliently yieldable means opposing the action of said electrically operated means.

5. In combination with a multi-cylindered internal combustion engine having an engine operating control, a separate thermostat for each cylinder and mounted in thermal communication therewith, an electrically operated means operatively connecting said thermostats and said engine control to actuate the latter when the temperature of any of said cylinders reaches a predetermined degree, and resiliently yieldable means opposing the action of said electrically operated means, said means being adjustable to vary the effective force of said yieldable means.

6. In combination with a multi-cylindered internal combustion engine having an engine operating control, a separate thermostat for each cylinder and mounted in thermal communication therewith, an electrically operated means operatively connecting said thermostats and said engine control to actuate the latter when the temperature of any of said cylinders reaches a predetermined degree, said means being adapted to permit of normal temperature increases without affecting said control, and resiliently yieldable means opposing the action of said electrically operated means, said means being adjustable to vary the effective force of said yieldable means.

In testimony whereof we have affixed our signatures.

EARLE A. RYDER.
ALEXANDER H. KING.